(12) United States Patent
Calmettes et al.

(10) Patent No.: US 9,786,182 B2
(45) Date of Patent: Oct. 10, 2017

(54) DRIVING VEHICLES IN CONVOY

(71) Applicant: THALES, Courbevoie (FR)

(72) Inventors: Thibaud Calmettes, Toulouse (FR); Michel Monnerat, Toulouse (FR); Damien Serant, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/664,427

(22) Filed: Mar. 20, 2015

(65) Prior Publication Data
US 2015/0269845 A1 Sep. 24, 2015

(30) Foreign Application Priority Data

Mar. 21, 2014 (FR) ...................... 14 00684

(51) Int. Cl.
| G01C 21/26 | (2006.01) |
| G06F 19/00 | (2011.01) |
| G08G 1/00  | (2006.01) |
| G05D 1/02  | (2006.01) |
| G01S 19/03 | (2010.01) |
| B60W 50/04 | (2006.01) |

(52) U.S. Cl.
CPC ............... G08G 1/22 (2013.01); G01S 19/03 (2013.01); G05D 1/0293 (2013.01); B60W 2050/046 (2013.01); B60W 2550/402 (2013.01)

(58) Field of Classification Search
None
See application file for complete search history.

(56) References Cited

U.S. PATENT DOCUMENTS

| 5,999,880 A | 12/1999 | Okada et al. |
| 6,546,040 B1 * | 4/2003 | Eschenbach ............ G01S 19/09 |
| | | 342/357.46 |
| 7,388,541 B1 * | 6/2008 | Yang .................... G01C 21/206 |
| | | 342/464 |
| 7,593,811 B2 * | 9/2009 | Schmidt ............... G05D 1/0278 |
| | | 701/300 |

(Continued)

FOREIGN PATENT DOCUMENTS

| FR | 2969766 A1 | 6/2012 |
| GB | WO 2016083492 A2 * | 6/2016 ............. G01S 7/003 |

*Primary Examiner* — Thomas G Black
*Assistant Examiner* — Demetra Smith-Stewart
(74) *Attorney, Agent, or Firm* — Baker & Hostetler LLP

(57) ABSTRACT

A method is implemented by computer for the management of a convoy comprising at least two vehicles, each of the at least two vehicles comprising satellite positioning means and vehicle-to-vehicle communication means, the method comprising the determination of the relative positioning of the vehicles, the determination comprising the measurement of the propagation time of a signal between vehicles by the communication means, the clocks associated with the communication means being synchronized via satellite positioning means at a reference clock time. Developments comprise the communication between the vehicles of various data (e.g. measurement uncertainties, signal-to-noise ratios, residual values), the determination of absolute locations, the use of an SBAS-type system, the use of differential GPS, the use of Doppler measurements for the turns or even the exclusion of a failing satellite. A computer program product and associated systems are described.

16 Claims, 3 Drawing Sheets

(56) References Cited

U.S. PATENT DOCUMENTS

| | | | | |
|---|---|---|---|---|
| 7,990,283 | B2* | 8/2011 | Breed | B60N 2/2863 |
| | | | | 340/435 |
| 8,155,045 | B2* | 4/2012 | Sherman | H04L 12/1881 |
| | | | | 370/312 |
| 2004/0193372 | A1 | 9/2004 | MacNeille | |
| 2004/0204850 | A1* | 10/2004 | MacNeille | G01S 3/14 |
| | | | | 701/469 |
| 2008/0125972 | A1* | 5/2008 | Neff | B60W 40/02 |
| | | | | 701/300 |
| 2009/0315777 | A1* | 12/2009 | Baughman | G01S 5/04 |
| | | | | 342/457 |
| 2013/0030606 | A1* | 1/2013 | Mudalige | G08G 1/22 |
| | | | | 701/2 |
| 2014/0010554 | A1 | 1/2014 | Midavaine | |
| 2015/0081201 | A1* | 3/2015 | Rubin | G08G 9/02 |
| | | | | 701/301 |

\* cited by examiner

DRIVING VEHICLES IN CONVOY

CROSS-REFERENCE TO RELATED APPLICATION

This application claims priority to foreign French patent application No. FR 1400684, filed on Mar. 21, 2014, the disclosure of which is incorporated by reference in its entirety.

FIELD OF THE INVENTION

The invention relates to the field of signal processing and in particular that of the driving of vehicles in convoy.

BACKGROUND

The technical problem raised is that of tracking the positions of vehicles travelling in convoys. The lead vehicle can be driven by a driver. One or more vehicles of the convoy can be driven automatically. The distances observed between vehicles are typically of the order of ten or so meters. Since the reaction time of one vehicle to the next is linked to the measurement time and to the communication time between vehicles, reaction times of 0.1 second can be accessed. At 40 m/s (145 km/h), this corresponds to a minimum distance of 4 meters between pairs of vehicles (the distance has to be kept to the minimum to avoid the appearance of undetectable obstacles or events between two vehicles, for example an animal crossing the road).

This technical problem arises mainly in the context of routine following. In critical conditions (emergency braking for example), the detection of the actions of the first driver and the reactions of the first vehicle can be done by means of sensors suited to these critical phases (notably odometers), conservative strategies then being able to be envisaged. However, these dedicated sensors do not have a resolution and a stability that is sufficient for routine measurements.

The state of the art discloses very few methods that make it possible to solve this technical problem and the results are generally not satisfactory. For example, some techniques use artificial vision and/or ground marking following systems (for example RFID chips inserted into the roadway). These methods require heavy and costly instrumentation or are not flexible.

One solution consists in synchronizing the clocks of the different vehicles, for example on their departure (and/or in compensating the drifts of these different clocks over time). The measurement of the communication times between the vehicles divided by the speed of light would then theoretically make it possible to deduce the separating distances between vehicles. In reality, this approach does not work, given the clock drifts that are commonly observed (the distance error is then around 10 or so meters).

There is an industrial need for processes and methods that make it possible for convoys of vehicles to travel in safety, particularly outside of the major highways.

SUMMARY OF THE INVENTION

In one embodiment, the invention combines the use of a positioning system (GPS or Galileo or other) and of an inter-vehicle communication system (which can generally be of any type).

In one development, the clock synchronization can be performed by means of GPS access, which if necessary, gives a reference clock time and, what is more, one that is shared between the vehicles. This approach eliminates the problems resulting from any clock drifts.

The invention makes it possible to put in place robust automatic driving strategies (for example driverless) for convoys of trucks or of any other type of land vehicles (cars and/or trucks and/or motorbikes and/or buses, etc.).

The invention will also be advantageously applicable for certain situations concerning air traffic, for example for convoys of miniaturized drones intended for logistical operations and travelling in convoy in determined air corridors.

Some embodiments of the invention can afford significant savings in terms of logistics and/or transportation (for example for heavy industries of mining industry type). The management of the fleets can be optimized and the safety of the transport can be reinforced.

The vehicles (e.g. trucks) can be positioned or located by GPS (or, more generically, by GNSS system, a term which denotes all the satellite positioning systems, e.g. GPS, Galileo and others). In the rest of the description, the terms GPS, Galileo, or GNSS are used interchangeably.

In one embodiment, the GPS operates in standard or "absolute" mode (that is to say that each vehicle of the convoy independently determines its own positioning from the others).

In another embodiment, the GPS operates in differential mode (DGNSS). This differential mode is also called "relative mode" (via the broadcasting over the communication channel of data of DGPS type), that is to say that the positioning of a vehicle can be improved by virtue of the knowledge of the positioning of the other vehicles, which serve to enhance the accuracy of the positioning.

Additionally, it is also possible to instrument the vehicles (i.e. all or some of the vehicles of the convoy) by means of inertial systems (odometers for example), useful when the convoy passes through physical tunnels and/or areas in which the GPS reception is temporarily interrupted (in an urban traffic situation, reception of the GPS signal being prevented by the buildings and/or the vegetation, bad weather conditions, etc.).

Also additionally, it is possible to complement the embedded instrumentation for all or part of the convoy. For example, one or more vehicles can have one or more radars installed, or even optical systems (computer vision for collision detection, the detection of pedestrians or of obstacles, for following white lines on the roadway, etc.).

The communication channel can itself be used as additional measurement means to make the use of the GNSS more robust, in order to eliminate the risks of integrity (global or local) and of unavailabilities (tunnels for example). In addition, inertial measurements can be used.

Among other advantages, the invention makes it possible to remedy the long delay (6 seconds) required for the warning and the associated corrective actions of the SBAS augmentation systems of Egnos type, a delay which is generally too long for vehicles travelling on a road at high speed. The embodiments described allow for robust and rapid detections of relative movements and therefore make it possible to maintain compliant situations (at least during this warning delay).

Some embodiments of the invention make it possible to improve location performance levels (by the provision of additional differential measurements), integrity (via a GNSS-independent measurement means making it possible to reveal local or global non-integrities thereon), availability (when passing through tunnels for example, by maintaining accurate distance measurements, notably in the context of coupling with inertial sensors). These advantages are obtained without significantly increasing the installed hardware complexity, the GNSS processing and communication modules already being commonly available on the market.

A method is disclosed, possibly implemented by computer, for the management of a convoy comprising at least two vehicles, each of the at least two vehicles comprising satellite positioning means and vehicle-to-vehicle communication means, the method comprising the determination of the relative positioning of said vehicles, said determination comprising the measurement of the propagation time of a signal between vehicles by the communication means, the clocks associated with the communication means being synchronized via satellite positioning means at a reference clock time.

The convoy comprises at least two vehicles, of any type (car, motorcycle, bus, truck, etc.). The convoy is a dynamic entity: a vehicle can leave the convoy, a vehicle can join a convoy, two convoys can merge (several vehicles can be considered as being a single vehicle in a systematic perspective, etc.).

Measurement of the propagation time corresponds to the TOA (Time of Arrival). The measurement in itself is performed by the receiving vehicle, by means of the time value declared by the transmitting vehicle. The measurement of the propagation time (of a signal for example) between two vehicles gives access to the inter-vehicle distance information (the mutual relative speeds of the vehicles being negligible compared to the speed of light). It should be noted that, in the case where the convoy comprises more than two vehicles, a number of propagation times can be measured (between any two vehicles of a convoy, for example between the second and the seventh vehicle). Subsequently, these times can be subjected to statistical processing operations (e.g. associated with confidence intervals, etc.). Combinatorial optimizations or verifications can also be performed (for example, the propagation times from a given vehicle to respectively all the other vehicles of the convoy can be measured, the measurement from a vehicle A to a vehicle B compared to the measurement from a vehicle B to a vehicle A, etc.).

The signal can be an electromagnetic signal or a light signal (for example one or more lasers). In some economical cases, the signal can be a sound signal (if necessary, the speed of propagation of sound is known as a function of the atmospheric pressure/altitude and the speed of the vehicles is not negligible compared to the speed of propagation of the signal). The specific features and limitations of the sound embodiment render this particular embodiment, but not without interest (inexpensive, it can also complement other embodiments). Generally a signal of undulatory type can be used (microwave beam, visible light, IR, etc.). The communication means between vehicles can therefore be radio and/or light, e.g. laser and/or sound, etc. The redundancy of the signals makes the overall system robust.

The synchronization of clocks is obtained via the satellite signal. Each vehicle has a clock time which is specific to it. According to certain embodiments, the invention aims to harmonize or adjust or synchronize the different clocks of the different vehicles forming the convoy. The method is therefore entirely a combination of means, acting in synergy (a result of one being reused by the other in a "cybernetic" loop).

The "reference clock time" denotes the time after the comparison and the synchronization (real or virtual) of the different clocks of the different vehicles. This reference clock time ("common clock time" or even "synchronized clock time") serves as a reference for the computation of the propagation time or times of the signal between the vehicles, and is used in determining the relative positioning of the vehicles (positions in space of the vehicles relative to one another).

Different variants of synchronization of the clocks are possible. The satellite positioning means can calibrate the synchronization for example. They can notably initialize a clock time and/or proceed with adjustments or synchronizations at regular or irregular intervals (periodic or intermittent or opportunistic or according to particular driving events for example).

The "reference clock time" can therefore be readjusted from time to time (the reference can change). The reference clock time in particular can be used to time-stamp the signal transmitted between the vehicles (for example by the transmitting vehicle). One possible synchronization method can consist in resetting the clock of the communication means of one or more vehicles according to the satellite navigation clock ("clock calibration"), to construct a single clock ("real" synchronization). Another method can consist in keeping distinct clocks (the different communication modules each retain their clocks for example), but in measuring the deviation between the different clocks and in transmitting this deviation via the communication channel between the vehicles (the deviation being subsequently taken into account in computations of relative positioning, "virtual" synchronization). In fact, these methods and their many variants have in common the fact that an independent and external time reference is injected into the computation of relative positioning of the vehicles, which is reflected by the use of the expression "the communication means [are] synchronized via the satellite positioning means".

In practice, because of the programmability (or non-programmability) of a clock embedded in a vehicle, the clock concerned can, de facto, be advanced or retarded (the delay or advance will be able to be stored). Alternatively, if a clock cannot be modified, its inclusion in a wider system will make it possible to neutralize its advance or its delay in the subsequent computations.

The method described is suitable for the management of a convoy, generally. A vehicle can have a drive system (automatic driving, remote guidance, driving by a driver, assisted driving, etc.) or not have a drive system as such (if necessary, the vehicle mimics, imitates or reacts to the driving of one or more other vehicles of the convoy).

In one development, the method further comprises the communication between the vehicles of the uncertainty associated with the reference clock time.

The uncertainty of the clock time associated with a vehicle can be determined or computed or estimated or quantified. This uncertainty (of measurement of the clock times specific to each vehicle) refers to the reference clock time, common to the vehicles forming the convoy (or to at least a majority of them). A drift can be determined by means of independent sources for example (relative mode). A probability of drift can also be estimated without having to use a third-party source (absolute mode). A drift or a deviation can result from comparisons combining absolute and relative estimations. In one development, the vehicles (e.g. the communication means and/or the GNSS means) exchange this information concerning the measurement uncertainty associated with their clock. For example, at least two vehicles can share the information regarding the estimated quality of the calibration of their synchronization. In other words, a vehicle can cooperate with at least some of the other vehicles of the convoy by sharing or by communicating or by transmitting or by broadcasting the time measurement uncertainty information specific to it (knowing the reference time as defined collectively).

In one development, the method further comprises the communication between the vehicles of information relating to the signal-to-noise ratios of the measurements from the satellite positioning means.

In one development, the method further comprises the communication between the vehicles of information relating to the signal-to-noise ratio of the communication signal between the vehicles forming the convoy.

The measurement error on the communication signal will be equivalent to an error on the clock.

In one development, the method further comprises the communication between the vehicles of information relating to the measurement residual values on the signals received from the satellite positioning means.

For a vehicle, a "satellite residual value" or a measurement residual value on the signals received from the satellite positioning means (e.g. measured for a vehicle/satellite pair)—corresponds to the deviation between the pseudo-distance measured (i.e. in reality) between this vehicle (e.g. its GNSS receiver) and the satellite concerned and between the pseudo-distance computed or expected between the position finally estimated of this vehicle and the satellite concerned.

The concepts of "signal-to-noise ratio" and of "residual values" are distinct. It is possible to observe significant residual values for example because of a specular multiple path with no true attenuation of the signal-to-noise ratio.

In one development, the method further comprises the determination of an absolute location of one or more vehicles forming the convoy.

In addition to the relative positioning of the vehicles relative to one another, the method can predict the absolute location of one or more vehicles forming the convoy. "Absolute location" should be understood to mean the precise geographic situation of the vehicle or vehicles concerned.

The absolute location can be obtained by means of the various GNSS coordinates received by the GPS vehicles, and by means of the different relative positionings of the vehicles relative to one another. In other words, it is possible to mutually corroborate the various information items, whether they are received or whether they are computed (GNSS information, relative position information, SBAS information, etc.). The different values can be subjected to statistical processing (such as computations of mean, standard deviation, weighting, equalization, interpolation, etc.).

In one development, the determination of the absolute location advantageously uses the satellite residual values as previously described.

In one development, the relative positioning of the vehicles is rid of the data received by a regional augmentation system of the satellite positioning means.

A GNSS system can be the subject of a so-called regional improvement or augmentation or optimization. For example, the SBAS system corresponds to a regional augmentation of a GNSS system. Ordinarily used for aircraft (in landings), the application to land transportation is novel, all the more so in combination. The system concerned for example a) warns of scheduled service interruptions and b) communicates certain correctional terms to improve the position in the event of observed failures or malfunctions (delay of six seconds).

In one development, the satellite positioning means are satellite positioning means operating in differential or relative mode.

The satellite positioning means can operate according to two main modes. In "standard" operation, the location information is deduced from the reception of the satellite signals: in other words, the location depends only on the reception of the satellite signals and nothing more. In a so-called "relative mode" operation, the location is deduced from a number of receivers, which may or may not be in motion. According to certain embodiments of the invention, the location is performed by means of receivers which are all in motion. According to other embodiments of the invention, the location is performed by means of receivers, some of which are fixed (fixed receivers associated with the infrastructure for example) and some of which are in motion. The fixed references can therefore be non-vehicle references (pedestrian, infrastructure reference such as bridge, mast, building, differential GPS station, etc.).

The differential or relative mode operation of the satellite positioning means, despite everything, remains entirely optional. If such a mode may be advantageous in terms of accuracy, it may, on the other hand, present contra-indications in certain situations. For example, when passing through physical tunnels, or areas of interference, the satellite signals may be interrupted. Consequently, the relative positioning can be performed only on the sole basis of the measurement of the propagation times between the embedded communication means.

As a first approach, in a simplified, theoretical and reductive manner, it can be considered that the different combinations of means are associated with staged performance/cost ratios. The measurement of the propagation time between the communication modules requires apparatus that is inexpensive and supplies a fast first approximation of the relative positionings. The addition of a GNSS satellite positioning system makes it possible, via the synchronization of the clocks, to improve the accuracy of the relative positionings. Cumulatively, the sharing and the processing of the satellite residual values continue to improve the accuracy. Still cumulatively, the relative mode operation of the satellite positioning continues to increase the gains in terms of accuracy. Finally, the combination of all the means (DGPS, processing of the residual values, measurement of the propagation times between the communication modules) culminates in the best possible accuracy (while preserving reasonable hardware costs).

The method advantageously exploits the use of a redundancy of the positioning systems. In particular, the processing of the residual values makes it possible to significantly augment the confidence in the determination of the configuration of the convoy.

The redundancy of the positioning systems provides an additional advantage, in as much as it contributes to the robustness of the overall system. For example, if the embedded systems of a vehicle (for example a truck) start to drift or to become partially or progressively out of service, the rest of the convoy remains able to mitigate these particular inadequacies. Among other advantages, said redundancy allows for an increased reliability (minimization of the impact of the interfering factors, adaptation to the areas without GPS visibility such as tunnels).

There is a redundancy of information between the communication means and the differential positioning means: the two means supply a relative positioning.

In one development, the method further comprises the measurement of frequency of the communication means, the frequency measurement making it possible to detect turns of one or more vehicles.

A Doppler measurement corresponds to the derivative of the signal reception frequency. In other words, the measurements associated with the propagation of the signal by the communication means make it possible to perform measurements of Doppler type. This type of measurement is suited to driving events of the type of change of lane, straight line departure or turn (following the curve of a road or motorway, urban intersections, etc.). In physical terms, because of the relative movement between the vehicles forming the convoy (for example when a truck turns), the frequency is modified between the vehicles. These measurements of frequency variation with the communication means make it possible to refine the tracking of the relative positioning of the vehicles in the turns.

In one development, the method further comprises the calibration of the transmission frequency of the communication means by the satellite positioning means.

The satellite positioning means can also be used to calibrate or to serve as a reference for the transmission frequency of the communication channel. This advantageous calibration remains entirely optional. The calibration of the transmission frequency by the GNSS is not essential. In effect, a relative stabilization of the transmission frequency is generally required to know an instantaneous turn accurately, but it is also possible to consider the variation of the reception frequency, in other words the derivative of the reception frequency, or the Doppler derivative, as metric of turn detection and of measurement of the curvature thereof. This can amount to assuming that the initial received frequency measurement was made in a straight line, without having any absolute means of checking on the measurement itself (but it is possible to check that the movement is indeed performed in a straight line by tracking the GPS position, or even better by the inertial sensors on the vehicle or vehicles).

The GNSS data are advantageously combined to complement the measurements of the communication channel. The clock synchronization makes it possible to achieve reliable measurements of the variations of distance between vehicles, including if the speed of the vehicles changes. The management of the turns can also benefit from GNSS-provided contributions although to a lesser extent compared to the management of separating distances in a straight line. It should be noted that a resetting of the rotation curvature radii can be performed by a manoeuvre consisting in pairing vehicles side by side (or almost, modulo a minimum safety distance) for a few seconds, and do so for example every ten or so kilometers.

In one development, the method further comprises the measurement of the received power by one or more of the communication means.

The received power measurement can, in certain cases, usefully corroborate the distance estimations for the determination of the relative positioning of the vehicles forming the convoy. The received power decreases at $1/r^2$, r being the distance between the vehicles concerned. If the transmission power is known and the received power is measured, it is possible to deduce the distance therefrom. In an environment of urban type with reflections and electromagnetic diffusions, the effects of humidity and other parameters mean that the decay is approximately $1/r^2$ modulo certain corrective factors. This optional embodiment is therefore advantageous in certain cases.

In one development, one or more vehicles forming the convoy share the same communication means and/or the same positioning means.

It is possible to accept into the convoy vehicles that do not have, or that partially have, the apparatus required by the method. In particular, it is possible to envisage different configurations allowing for the implementation of one or more steps of the method. For example, one or more vehicles can share one and the same communication means. Gateways or "bridges" can for example enable an under-instrumented vehicle to join the convoy. For example, by means of a connection provided by a mobile telephone, GPS information, possibly degraded, can be shared with the other vehicles of the convoy. Similarly, a vehicle without positioning means can be authorized within a convoy provided that complementary means are implemented (for example a reversing radar installed in the vehicle in front can mitigate an insufficiency of positioning means). Generally, a convoy according to the invention comprises at least two vehicles instrumented according to the invention, that is to say each comprising communication means and satellite positioning means operating in combination (e.g. synergistically). Ideally, all the vehicles of the convoy are instrumented according to the invention. In a "degraded" embodiment a majority of vehicles is instrumented according to the invention and a minority of non-instrumented vehicles is incorporated in the convoy. A convoy can in effect incorporate vehicles that are not instrumented according to the invention or partially instrumented or differently instrumented. For example, a vehicle driven by a human driver can join the convoy. In this case, even in the complete absence of instrumentation, the driver or pilot (including remote driving) can maintain the safety distances with his or her neighbours (vehicle behind and vehicle in front). One or more vehicles can comprise (for example only) physical guiding means (e.g. "booms" of a few meters spacing the vehicles apart, with measurements of the drifts and appropriate servo controls for maintaining a substantially constant distance). Electronic guiding means (for example by laser measurement and with similar servo controls with the driving system) can also allow third-party vehicles to join the convoy. Inertial means (for example odometer) can be used. A vehicle may also comprise only one or other of the communication means and the GPS means.

In one development, a vehicle is authorized to join or leave the convoy of vehicles.

The authorization to join or leave the convoy can comprise different sub-steps. For example, initially, the requesting vehicle can—for example and optionally—be authenticated (exchange of security certificates for example) with one or more vehicles of the convoy, which can vote to accept or reject the requesting vehicle. The criteria used can comprise taking into account the instrumentation available in the requesting vehicle (in itself or according to an overview of the system, that is to say according to what the requesting vehicle brings in terms of instrumentation).

A vehicle can in certain configurations denote a plurality of vehicles considered jointly. A vehicle can therefore be a mobile entity, the perimeter of which can change. A vehicle can comprise a plurality of mobile entities. In other words, convoys can merge or split. Convoy coalescence phenomena can be observed, in relation to the technical characteristics and/or the performance levels (of the embedded instrumentation for example making it possible to perform one or more steps of the method).

In one development, an absolute location information item is received from a fixed and authenticated source.

When the convoy is moving, third-party information may add to the determination of the absolute positioning of the convoy. In order to avoid computer hacking scenarios (for example a compromised beacon sending false information or incorrect information to the different vehicles, or trying to saturate the communication means), one embodiment of the invention encrypts (optionally) the communication of information, and, cumulatively, organizes the exchange of security certificates in order to prove the authenticity of the third-party sources. For example, a beacon associated with a road bridge, the location of which is very accurately known, will be able to be authenticated with one or more vehicles forming the convoy, then exchange location information in an encrypted manner. In particular, the individual propagation times of the different vehicles to said beacon will be able to be measured, and subsequently come to corroborate or refine the location and/or the relative positioning of the vehicles forming the convoy. The communication can be unilateral (for example, the fixed beacon simply sends its location) but it can also be bilateral (the beacon can be invoked, can exchange security keys, can deliver information with different levels of accuracy depending on the authorization levels of the vehicles transmitting the requests, etc.).

In one development, the method comprises the exclusion of a failing satellite for the determination of the positioning of a vehicle and/or for the estimation of the reference clock time.

In one development, a satellite may be revealed to be failing or defective (constantly or permanently, or for example over a given time interval). This failure may be declared (by an outside system, and therefore received by one or more vehicles forming the convoy) or determined by rights by one or more vehicles (for example after a vote or according to confidence thresholds or quantitative criteria, etc.). Subsequently, the embedded positioning means can disregard the failing satellite. The positioning means can be programmable or non-programmable: the exclusion of a satellite from the constellation can be performed at different levels. The satellite can be excluded by all or some of the embedded GNSS receivers. If a receiver is not programmable, the failing satellite will be taken into account for the determination of the location of the vehicle in which the receiver is embedded but this vehicle cannot participate in the estimation of the synchronized clock time. The convoy can decide "collectively" (majority vote or other schemes), according to the data received (raw GNSS data and/or residual values and/or signal-to-noise ratio) and the propagation times, that a satellite has a problem and to exclude it for a time from any clock estimation throughout the convoy. This exclusion process can for example be based on the observation that a particular satellite gives a strong residual value compared to the solution obtained with all the other satellites and the communication signals, and on all the receivers of the convoy. Compared to a regional augmentation system of SBAS type, this rapid elimination of a disturbed satellite adds the taking into account of the communication measurement, can be dealt with within detection delays that are substantially shorter than the six seconds of the SBAS (i.e. compatible with the driving of the convoy), and also makes it possible to take into account the possibility that the disturbed satellite is not a satellite but in fact a decoy on the ground. At regular intervals, the signal from said satellite can be tested by one or more vehicles so as to continue to disregard the satellite or in order to once again take it into account.

A system is disclosed that comprises means for implementing any one of the steps of the method. In particular, the system can use satellite positioning means, communication means, computation means, information storage means, information display means. The communication means advantageously use a UWB modulation. The UWB modulation offers the advantage of allowing for a good propagation time measurement quality. The communication means in particular can be of GSM (2G), UMTS (3G), LTE (4G), CDMA2000, Tetra, UWB, Zigbee, Bluetooth, DSRC, Wifi, Wimax type.

One, several or all of the steps of the method can be implemented by computer. A computer program product comprising code instructions makes it possible to perform any one of the steps of the method when the program is run on a computer.

BRIEF DESCRIPTION OF THE DRAWINGS

Different aspects and advantages of the invention will emerge in support of the description of a preferred but nonlimiting implementation of the invention, with reference to the figures below.

DETAILED DESCRIPTION

Figure 1:
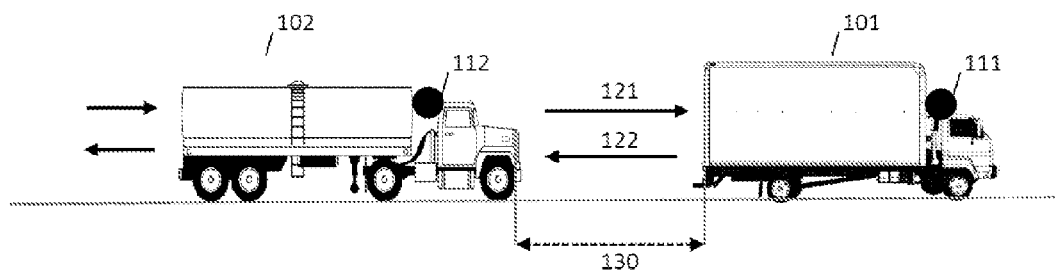
FIG. 1 illustrates a portion of convoy according to the invention.

A "vehicle" according to the invention can be a truck (of any type, e.g. a pick-up truck or a heavy goods vehicle, etc.), a mobile robot (including aircraft), a motorcycle, a car.

A "convoy" can be made up of vehicles of different types or else made up of vehicles that are substantially of the same model. A preferred application of the invention relates to convoys of trucks (train of heavy goods vehicles). A convoy can change over time: vehicles can join or leave a convoy that has been formed. A "convoy" is therefore a dynamic object, the composition of which is not fixed. Several convoys can merge together. A convoy can split up into several new convoys. The invention is advantageously applicable in these logistical "coalescence" situations.

A GNSS (Global Navigation Satellite System) system covers all the satellite positioning systems, for example Glonass (Russian), GPS (American), Galileo (European), etc. The expressions "GPS" or "Galileo" or "GPS and Galileo" are used interchangeably and refer to all or some of the system generically called GNSS.

The use of a GNSS system is problematical for the driving of convoys, or more generally for automatic driving applications. A GNSS system is typically affected by limitations linked to the number of satellites in the constellation in sight or operating correctly. The technical problem is in effect partly that of the integrity of the signal. This integrity can be lessened for various reasons: clock jump, satellites unavailable, natural or local interference of road tunnel type for example, presence of jammers which, although generally prohibited, could disrupt a location, etc.).

A GPS or Galileo receiver performs various operations, notably a correlation operation consisting in making the code received from the satellite and the code produced internally by the receiver coincide in time. The GPS or Galileo signal also makes it possible to measure a deviation between the undulations of the carrier of the received signal (the phase of the received signal) and the undulations of the carrier of the signal generated internally by the receiver (the face of the signal generated internally). The measurement by phase deviation confers great accuracy, less than 20 cm (by code and phase measurement accumulation). Some receivers can use a regional or local augmentation, for example for approach and landing phases in the air navigation applications. These receivers use, in addition to the Galileo GPS signals, an independent source of information to guarantee the service performance levels.

The communication measurements are not used in the rare available prior art documents. GPS is not used in an urban environment. On motorways, the sky is generally open. In an urban environment, vegetation or buildings can hamper the GPS or Galileo reception, and this is all the more true when the accuracy has to be great.

The GPS reinforcement systems of SBAS (Satellite-Based Augmentation System) type are—among other aspects—systems which can preventatively alert the users or the systems of scheduled interruptions or failures of GNSS systems. These alerts can comprise correction information to be added to the signals. The delay of this type of system is approximately six seconds ("time to alert"), which, in a convoy traffic situation constitutes a delay which is (much) too long. In fact, terrestrial transport means do not use the SBAS system.

In one embodiment, a GPS in a standard mode is used. In another embodiment, the GPS is used in differential mode ("DGNSS"). The comparison of the transient times makes it possible to mutually position the receivers. Generally, the differential mode is used with at least one fixed receiver (the position of which is very accurately known, for example mounted on a mast for applications in agriculture). The instrumentation of the trunk roads with a multitude of such fixed GPS receivers is costly. Although it can be envisaged for motorways, this instrumentation is unrealistic for the secondary network. The differential mode according to the invention is performed mostly between receivers which are mobile, embedded in the vehicles. The use of fixed receivers is nevertheless not excluded.

FIG. 1 illustrates a portion of convoy according to the invention. FIG. 1 shows two trucks, lead 101 and follower 102, separated by a distance 130.

One vehicle communicates with the others (all the others, or with any part thereof, or with one or more of its followers and/or predecessors or even with any other of the convoy).

The propagation times between the vehicles are measured and compared (in fact between the antennas, the geometry of the vehicles, i.e. front and rear being known). To do this, a common clock time is required. Atomic clocks cannot realistically be embedded in each vehicle for cost reasons. The clocks of each vehicle must be and remain (relatively) synchronized: there is therefore a need for a reference clock.

Synchronization on departure of the vehicles would be insufficient in most cases (because of the clock drifts, apart from the fact that that would also prevent a new vehicle from joining a convoy already formed). There is therefore a need for a reference clock and this clock is defined via the positioning system, which supplies a common clock time. Furthermore, according to the invention, a method is disclosed for maintaining and improving the accuracy of this common clock time (the concepts of time and of location are linked, modulo the movement of information accessible via measurement means, for example inertial).

The geometry of the vehicles (front, rear, lateral dimensions, height) is known for each vehicle (it is predefined), as is the geometry between the communication antenna and the GPS antenna. This implicit information is incorporated in the computations. This information is not essential (in as much as corrective measures can be applied, for example by means of external or independent modules).

In one embodiment, the convoy comprising a number of vehicles has no driver (i.e. all the vehicles are driven automatically. In another embodiment, one or more vehicles are driven by a human driver. For example, only the lead vehicle is driven manually (and/or semi-automatically). In the context of such convoys, the first truck with a driver can be responsible for the actual driving, with, notably, the choice of the directions at the intersections, the choice of the lane on a multilane highway, and the detection of unforeseen obstacles (possibly assisted by automatic means of radar type). According to this embodiment, the first truck can transmit, via a dedicated communication channel, the road information to the following trucks, and so on, the following trucks being responsible for automatically reproducing the actions of the first and for maintaining a predetermined relative position.

Figure 2:
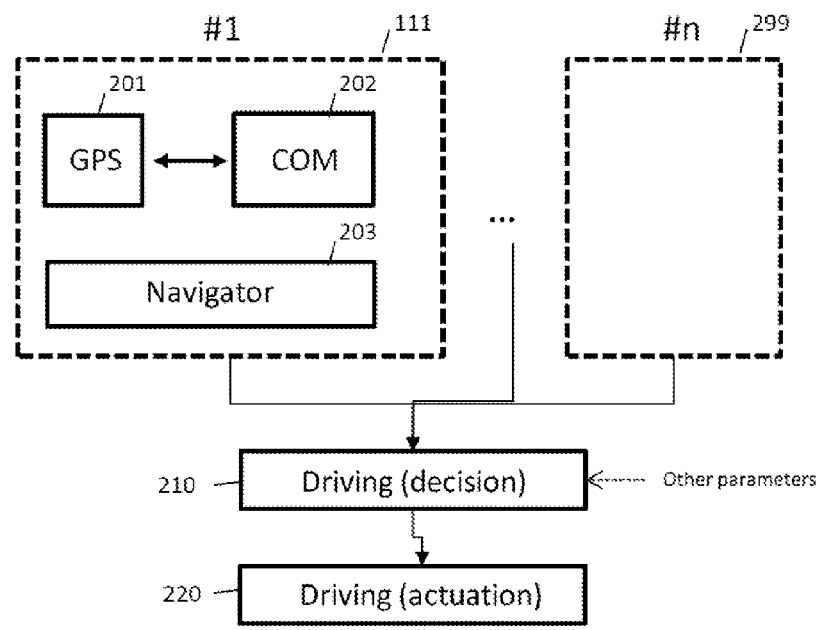
FIG. 2 illustrates an example of equipment embedded in a vehicle of the convoy and instrumented according to the invention.

FIG. 2 illustrates an example of equipment embedded on at least one vehicle of the convoy. The communication system between the trucks is used as additional measurement means, complementing the GNSS (and possibly inertial units). These measurements offer the advantage of being completely independent of the GNSS (therefore not subject to the same events), of being instantaneous, of being between successive vehicles, and of not requiring additional equipment (the inter-vehicle communication channel in any case being necessary for the critical situations (emergency braking for example)).

For this, two measurement elements are considered: the measurement of TOA (Time Of Arrival) for maintaining the distance, and the measurement of FOA (Frequency Of Arrival) for following on a bend. The invention favours, for this communication channel, the use of an OFDM modulation of mobile 4G type for its good TOA/FOA measurement quality on short communications in direct line of sight, and subject to a standardized definition of a synchronization carrier.

The TOA relates to the distance (between vehicles). In the case of the turns, visual means (image recognition or similar) are possible, but it is advantageous to make use of the communication channel, that is to say, without complicating the use of the GPS channel/signals. In the case of a turn, the Doppler changes (FOA) since the relative position of the vehicles changes (if the vehicles are in a state of relative immobility, the Doppler is zero).

Measurements of TOA and/or FOA are received/transmitted, by one or more vehicles. Statistical processing operations can be performed (averages, standard deviations, per pair of vehicles, or according to any other scheme, for example between vehicles numbered 3 and 17 and 18, etc.).

Apart from the lead vehicle 101 which can optionally contain other equipment, a vehicle according to the invention (for example 102) comprises a GNSS receiver 201 (optionally with the capacity to supply position measurements to one or more other vehicles, so that the latter can produce differential locations), interacting with a communication receiver/transmitter 202 (for example of mobile 4G OFDM or UWB type) capable of dating and accurately measuring the frequency of the received signals. Optionally, one or more vehicles also have one or more inertial sensors and/or odometers (cycle counters or similar) to facilitate the following of trajectory over the short and medium term. Still optionally, radar and/or optical means (robotic vision, infrared, etc.) complement the embedded instrumentation.

In one embodiment, one or more GNSS receivers can be compatible with the reception of integrity data by ground network or by SBAS in order to limit in time the degraded mode operation on the communication channel. It is, for example, possible to envisage considering that, if the communication channel 202 has detected a problem on a GNSS satellite and that this problem has not been reported by the SBAS system (if it is in sight) after 30 seconds (5 times the nominal Time To Alert, and notably more than the duration of a multiple path in a non-urban environment, there is an inconsistency and it is preferable to put in place driving strategies (stopping, slowing down, relative distance separating the trucks, etc.) pending a consolidation of the knowledge of the situation.

The trucks generally communicate between successors (other communication schemes will be disclosed hereinbelow), the position of the communication antennas on each truck having to be known accurately. The communication between the trucks can be performed by any known means (e.g. CB, Wifi, Bluetooth, 3G, 4G, LTE, Wimax, UWB). The communications are preferably local, i.e. from point to point, but the communications with greater latency times are not necessarily excluded (for example DVB).

Positioning information sources—other than the GPS or Galileo positioning system—can advantageously be used. Such information can be used in combination (e.g. to enrich the algorithms) or in such a way as to complement or be added to or juxtaposed with (to reduce the uncertainties, using correlation to improve the determinations of position, etc.). Such information can be optional in certain cases (navigation can do without such information) or be required when more deeply integrated in the algorithmic determination of the position. In certain cases, such information can also be substituted for (i.e. replaced with) the GPS information, wholly or partly. These sources can, for example, be information from GSM base stations accessed as the convoy moves, from other satellite systems, from data from Bluetooth, 2G, Edge, 3G, 4G, LTE or 5G, UWB networks, from data from Wifi networks through which the convoy passes, from data extracted from the roadway (for example RFID chips or according to other contactless technologies, inserted into sensors or probes present in the roadway), from information or confirmations supplied by aircraft or drones, from data sent by the vehicles travelling on the opposite or adjacent lanes, derived from other triangulation methods, etc. Different confidence levels (e.g. statistical interval of uncertainty or qualified levels of credibility of the sources, etc.) can be associated with the different information sources. Different methods (e.g. equalization and/or weighting and/or interpolation, optionally and for example taking into account the inertial units, etc.) can then be implemented to determine a resultant location.

On the received communication signals, the communication module in each truck performs a TOA/FOA measurement. The TOA measurement will mainly serve to maintain the distance, the FOA measurement to assess a turn speed in the case of a bend or of a change of lane.

These measurements are then compared with the absolute and differential GNSS measurements to eliminate any inconsistency, then these measurements are combined with the validated GNSS measurements to obtain a hybridized location solution. The residual value information collected on completion of the integrity checking and combination steps are stored in messages to the other trucks, the idea being that, if one truck has locally detected an inconsistency on a satellite, it may be advantageous to advise the other vehicles of the convoy to check this satellite more particularly and, if at all possible, avoid making use thereof.

The contributions of the communication channel or module 202 to the location are therefore manifold. The communication channel or module or box 202 transmits, between the vehicles (or some of the vehicles), DGNSS (differential) data, GNSS integrity data evaluated by each vehicle (possibly able to be recombined in overall integrity mode in the case where the observations of each vehicle agree on an overall source of error, for example of GNSS failure type), and differential location residual value data (which can serve notably—in the case where the GNSS integrity is consolidated—to reset the synchronizations of the time references of the communication modules). The location, the availability and the integrity are improved (partly because of the contributions deriving from the additional differential TOA/FOA measurements).

All of the information deriving from the navigators 111 to 299 (and other parameters possibly received from external navigation systems) is taken into account so as to provide a decision aid for the driving of the convoy. The actual driving 210 can correspond to rules concerning one or more vehicles and chosen from the list comprising stop on a hard shoulder and/or reduce speed and/or accelerate and/or sound alert and/or light alert and/or restore driving controls to the human driver, etc.

The driving aid system 210 interacts with a set of actuators, that is to say mechanical means of action for the driving. The actuators can supply information in return and modify the driving decisions (if, for example, a vehicle steering is defective, the driving decisions can be modified thereby).

Figure 3:
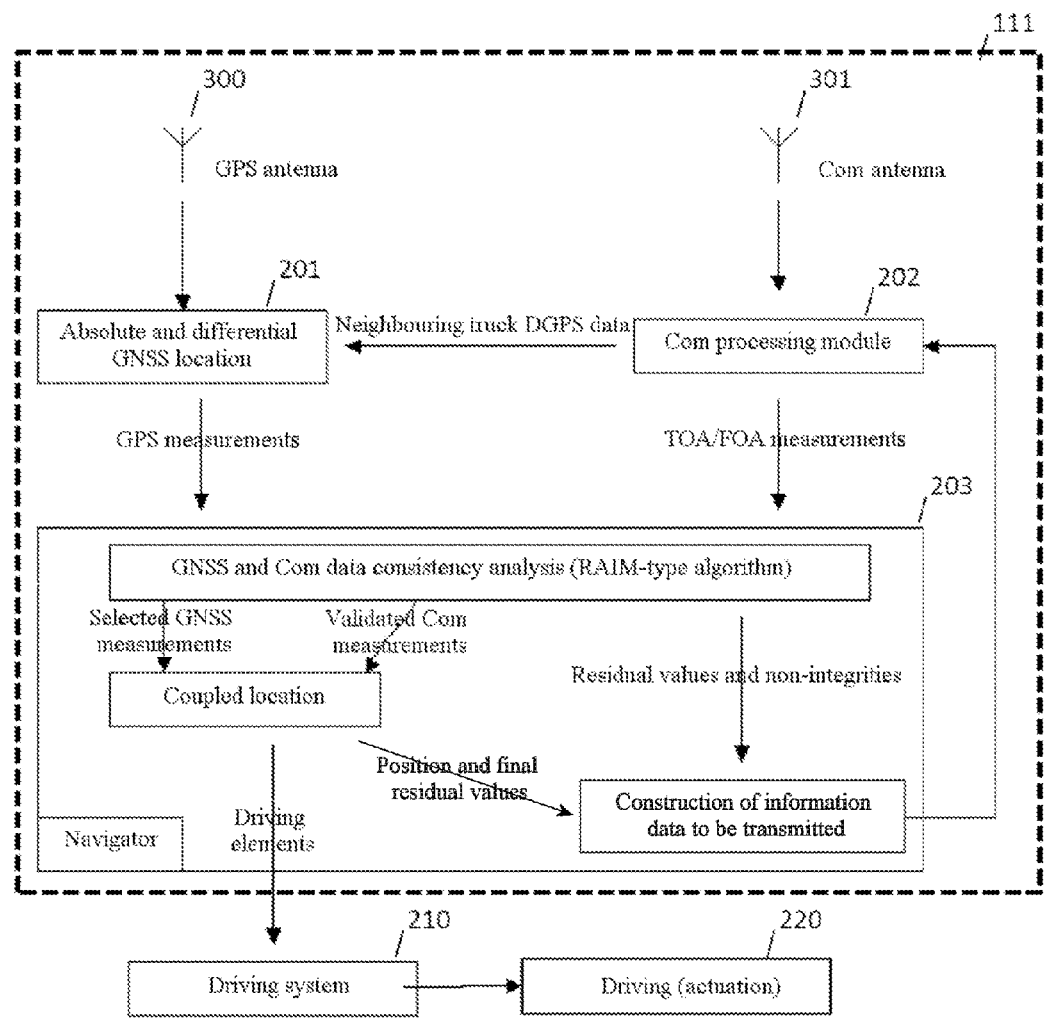
FIG. 3 shows a general and schematic view of the inputs/outputs of the navigator function embedded in a vehicle of the convoy according to the invention.

FIG. 3 shows a general and schematic view of the inputs/outputs of the navigator function embedded in a vehicle of the convoy. The reception and the processing of the signals for a vehicle are presented.

The synchronization of the clocks on the communication channel corresponds to one aspect of the invention. This synchronization is required to perform the TOA/FOA measurements, and is even so nominally performed by virtue of the calibration by a GNSS receiver, which creates a dependency of the TOA/FOA measurements with respect to the GNSS location and is detrimental to the integrity. According to one implementation of the invention, the synchronization of the clocks of the communication channel is advantageously controlled by the navigator block and not directly by the GNSS receiver. This approach makes it possible to incorporate in the synchronization control all the integrity information which has been able to be lifted elsewhere (transmitted by communication or evaluated locally), the elements added by the inertial sensors, and apply the necessary smoothings and circumventions to the measurement errors (for example by implementing resynchronization only in the periods when enough GNSS satellites of quality are visible, and by adjusting the overall strategies of speed and of separation between vehicles in case of long periods without resynchronization).

Figure 4:
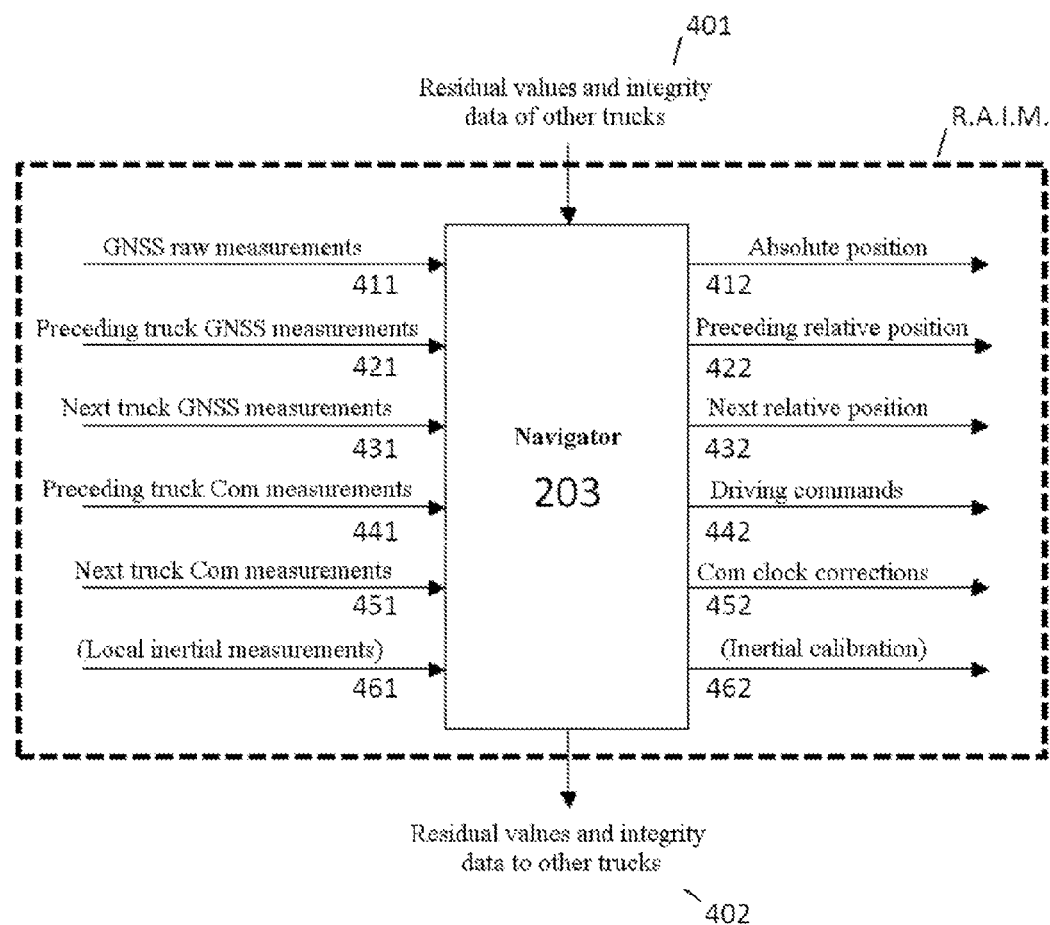
FIG. 4 stresses an aspect of the invention concerning the correction or the weighing provided by the analysis of the residual values.

FIG. 4 underscores one aspect of the invention relating to the correction or the weighting provided by the analysis of the residual values. Each vehicle makes a correction to the GPS time. Not only does it make this correction, but each vehicle declares the planned correction and communicates it to all the other vehicles. It is therefore possible to detect the defective channels, or the systematic biases. The vehicles can take into account the residual values.

FIG. 4 underscores an aspect of the invention concerning the correction or the weighting by RAIM (Ranging or Receiver Autonomous Integrity Monitoring) function. In the same way as the relative positioning of the vehicles of the convoy can be determined more accurately by means of the residual value computations, a function commonly available on the GPS receivers can advantageously be made to contribute. There are different types of GPS or Galileo receivers. These receivers can be instrumented with an integrity monitoring function. The technique called RAIM (Ranging Autonomous Integrity Monitoring) enables the receivers to autonomously detect the appearance of a malfunction or of a performance degradation of a defective satellite. The simplest receivers are designed to receive a single frequency from the GPS satellites (signal L1 C/A) or Galileo satellites (signal E5a or L1). They are generally equipped with ten or so reception channels to acquire all the GPS or Galileo satellites in sight. The more complex receivers can receive two frequencies (bi-frequency) from each satellite of the two constellations (GPS/Galileo combined receivers). In as much as the combined use of the independent GPS and Galileo constellations reinforces the reliability of the positioning, such combined receivers using the RAIM technique allow for accurate locations.

The determinations of the relative positions of the vehicles in the convoy can be improved by the use of this RAIM function available in the receivers, or more generally by the implementation of algorithms of RAIM type. This type of algorithm makes it possible to check the state of the signals received from the constellations of satellites. It signals the possibility of an unacceptable position error when an inconsistency in the set of distance measurements transmitted by the satellites is detected. This function is unavailable when the number of satellites received is insufficient or their geometry is unfavourable. According to the RAIM function, a receiver can therefore autonomously determine the appearance of a malfunction or of a performance degradation of a satellite for example. The RAIM is a technique or a function or a method used by certain receivers to determine whether the information received from the satellite is incorrect, by the observation of six other satellites. The doubtful information can be rejected by the receiver and is not generally used for the computation of a position. The RAIM is a computation technique, which can be implemented in the computer of the receiver for example, to detect the appearance of a degradation of the accuracy of the distance measurement originating from one satellite out of all the visible satellites. It relies on the availability of an excess of measurements from the satellites by virtue of the fact that the GPS Galileo constellations almost permanently offer more than 4 satellites in sight. The receiver can establish a number of positioning solutions, according to a number of combinations of satellites comprising 4 or more satellites. Through the comparison of the results supplied (notably by comparison of the signals between the different satellites and by analysis of the dispersion), the RAIM algorithms can identify the presence of a defective distance measurement from a satellite. It is thus possible to detect errors originating from a satellite as well as atmospheric effects or other local interference factors affecting the reception of the signals from a satellite. Simply put, five satellites make it possible to detect an anomaly and six satellites make it possible to isolate a faulty satellite (in order to exclude it from the positioning computation).

In fact, each input parameter in the navigator can be monitored. Generically, the deviation between the measurement (e.g. the position) actually observed (i.e. as determined by all the other vehicles) and the simulated measurement (i.e. determined by the vehicle according to its own embedded systems such as odometers, inertial systems, etc.) is determined.

In one embodiment, the RAIM is shared between the vehicles. The residual values are broadcast to the other vehicles. The residual value and integrity information from the other trucks can be used as weighting for the GPS or Galileo measurements, in the same way as the RAIM can correct them.

FIG. 4 also underscores another aspect of the invention concerning the redundancy of such information, adding an advantageous robustness to the overall convoy driving system. According to one aspect of the invention, the redundancy of the navigators embedded in each of the vehicles, or at least in one of them, makes it possible to improve the robustness of the overall system. For example, if one vehicle encounters problems with its positioning system and/or its communication system with the other vehicles, said other vehicles have the copy of the last state of the navigator of the defective vehicle and can consequently take measures that are appropriate to the situation. For example, by means of an extrapolation of the trajectory and of the speed of the defective vehicle, the head of the convoy can, for example, accelerate while the end of the convoy can slow down so as to increase the separating distance.

Other examples of reaction are possible (stop on the hard shoulder, establish communication by means of other emergency channels, sound and/or light emission, etc.). The methods and systems described aim to correct the clock times. In a particular embodiment, this correction can be achieved by redundancy. According to this embodiment, each truck permanently resets the time and the positions of all the other vehicles. If one vehicle is defective, the other vehicles will see that said vehicle is not responding and a predefined logic can be implemented (slow-downs, accelerations, etc.), possibly by actuating other means (visual or proximity sensors, radars, etc.). A systematic redundancy offers the advantage of standardization, i.e. economies of scale. The same equipment is deployed in all the vehicles.

In another embodiment, the redundancy is partial. In other words, certain vehicles in the convoy have identical (redundant) copies of the image of the overall system while others do not hold it, or do so only partially. These particular vehicles can, for example, accompany the convoy by virtue of other means (for example only radar detection means or by proximity detectors). Mechanisms for authenticating or authorizing vehicles "within" the convoy can be implemented. For example, version information on the embedded systems can inform as to the compatibility (or the incompatibility) with the methods or systems herein described.

In addition, measurements can also be carried out on the communication channel between non-successive trucks. Typically, the signals transmitted by the truck 1 can not only serve as a measurement medium for the truck 2, but also for the trucks 3, 4, 5, etc.; and, similarly, those transmitted by the truck 2 can serve the trucks 1, 3, 4, 5, etc. Given the propagation effects, it is to be expected that these measurements lose accuracy with distance, but they can, however, constitute a useable complement to avoid drifts by error build-up from one truck to another, notably with bends or turns.

Initially, the problem can be resolved with the use of a differential GPS system coupled to a communication channel. However, this solution can, despite everything, present residual integrity defects (disturbance of the GNSS signal at the global level (satellite failure for example) or at the local level (multiple paths for example). For an application that is also critical in terms of safety, it is therefore advantageous to hybridize the method described with the use of other sensors (or probes, as opposed to actuators).

One possible class of sensors corresponds to that of the inertial sensors. An inertial sensor makes it possible to remedy some of the limitations of the GNSS (passage under a bridge for example) but it presents the defect of a medium and long-term drift that is relatively great and above all unpredictable (typically, the drifts of the inertial sensors of each of the trucks of the convoy may be different, which means that, in the case of differential location based on these sensors, each will drift differently, which can lead to final distances between the first and the last truck greater for example than the length of the total line). This type of sensor does not make it possible to follow the mutual relative positions of the vehicles. Used to complement the methods and systems described, one or more inertial sensors make it possible to improve the robustness and the accuracy of the positioning of the vehicles. In the case where inertial measurements are available, they add a third source of information which contributes to the consistency analyses and to the location of the vehicles. These measurements can be particularly useful in the case of lengthy GNSS unavailabilities (tunnels for example).

Other types of sensors can also be used in combination, for example sensors of radar or optical type. The sensitivity of these sensors to the weather (notably rain) makes them difficult to use as an all-weather solution. They also have a fairly long reaction time (compared to DGPS for example) and a high equipment cost. Finally, they generally require a relative control of attitude, which is fairly difficult to implement in physical terms. The techniques based on radar therefore allow for complementary improvements, but improvements which remain generally limited and are currently associated with high costs.

The present invention can be implemented from hardware and/or software elements. It can be available as computer program product on a computer-readable medium. The medium can be electronic, magnetic, optical or electromagnetic.

The invention claimed is:

1. A method implemented by computer for management of a convoy comprising at least two vehicles, each of the at least two vehicles comprising a satellite positioning receiver and a vehicle-to-vehicle communication receiver/transmitter, the method comprising:
   determination of relative positioning of said vehicles, said determination comprising measurement of a propagation time of a signal between the at least two vehicles by the communication receivers/transmitters, clocks associated with the communication receiver/transmitter being synchronized via the satellite positioning receiver at a reference clock time;
   communication between the at least two vehicles of an uncertainty associated with the reference clock time with the communication receiver/transmitter; and
   communication between the at least two vehicles of information with the communication receiver/transmitter relating to signal-to-noise ratios of the measurements from the satellite positioning receiver.

2. The method according to claim 1, further comprising communication between the at least two vehicles of information relating to a signal-to-noise ratio of the communication signal between the at least two vehicles forming the convoy.

3. The method according to claim 1, further comprising a communication between the at least two vehicles of information relating to measurement residual values on the signals received from the satellite positioning receiver.

4. The method according to claim 1, further comprising a determination of an absolute location of one or more vehicles forming the convoy.

5. The method according to claim 1, wherein the relative positioning of the vehicles being rid of data received by a regional augmentation system of the satellite positioning receiver.

6. The method according to claim 1, wherein the satellite positioning receiver being a satellite positioning receiver operating in a differential mode.

7. The method according to claim 1, further comprising a measurement of frequency of the communication receiver/transmitter, the frequency measurement configured to detect turns of one or more vehicles.

8. The method according to claim 1, further comprising a calibration of the transmission frequency of the communication receivers/transmitters by the satellite positioning receiver.

9. The method according to claim 1, further comprising a measurement of a received power by one or more of the communication receiver/transmitter.

10. The method according to claim 1, wherein one or more vehicles forming the convoy sharing at least one of the following: a same communication receiver/transmitter and a same satellite positioning receiver.

11. The method according to claim 1, further comprising authorizing a vehicle to join or leave the convoy of vehicles.

12. The method according to claim 1, wherein an absolute location information item being received from a fixed and authenticated source.

13. The method according to claim 1, further comprising an exclusion of a failing satellite for a determination of at least one of the following: the positioning of a vehicle and for an estimation of the reference clock time.

14. A computer program product for implementing one or more of the steps of the method according to claim 1.

15. A system comprising means for implementing the steps of the method according to claim 1.

16. The system according to claim 15, wherein the communication receiver/transmitter is configured to use ultra-wideband (UWB) modulation.

* * * * *